(12) United States Patent
Fukawatase et al.

(10) Patent No.: US 6,916,042 B2
(45) Date of Patent: Jul. 12, 2005

(54) PASSENGER PROTECTION APPARATUS FOR A VEHICLE

(75) Inventors: Osamu Fukawatase, Nishikamo-gun (JP); Takeaki Kato, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/693,991

(22) Filed: Oct. 28, 2003

(65) Prior Publication Data
US 2004/0094943 A1 May 20, 2004

(30) Foreign Application Priority Data
Nov. 18, 2002 (JP) ........................................ 2002-333287

(51) Int. Cl.⁷ ............................................... B60R 21/04
(52) U.S. Cl. ........................................ 280/751; 280/753
(58) Field of Search ................................. 280/751, 752, 280/753, 748

(56) References Cited

U.S. PATENT DOCUMENTS 6,170,871 B1 * 1/2001 Goestenkors et al. .... 280/743.1
6,641,166 B2 * 11/2003 Browne et al. ............. 280/752
2004/0046377 A1 * 3/2004 Meduvsky et al. ......... 280/752

FOREIGN PATENT DOCUMENTS

| DE | 299 06 887 U 1 | 10/1999 |
| EP | 0 421 572 A2 | 4/1991 |
| JP | 58056945 | 4/1983 |
| JP | B2 2679405 | 8/1997 |
| WO | WO 01/36983 A2 | 5/2001 |
| WO | WO 01/68409 A1 | 9/2001 |

* cited by examiner

Primary Examiner—Faye M. Fleming
(74) Attorney, Agent, or Firm—Oliff & Berridge, PLC

(57) ABSTRACT

A passenger protection apparatus for a vehicle according to the invention has an excellent effect in that lower limbs of the vehicle occupant can be successfully held even during a frontal offset impact or an oblique impact. The passenger protection apparatus includes a pair of active knee bolsters provided in an instrument panel or at a vicinity thereof, each bolster being capable of restraining a corresponding lower limb of a passenger; a detector which, at a time of a collision, can detect a direction thereof; and a controller which, in accordance with the detection, can control the active knee bolsters independently from each other.

12 Claims, 8 Drawing Sheets

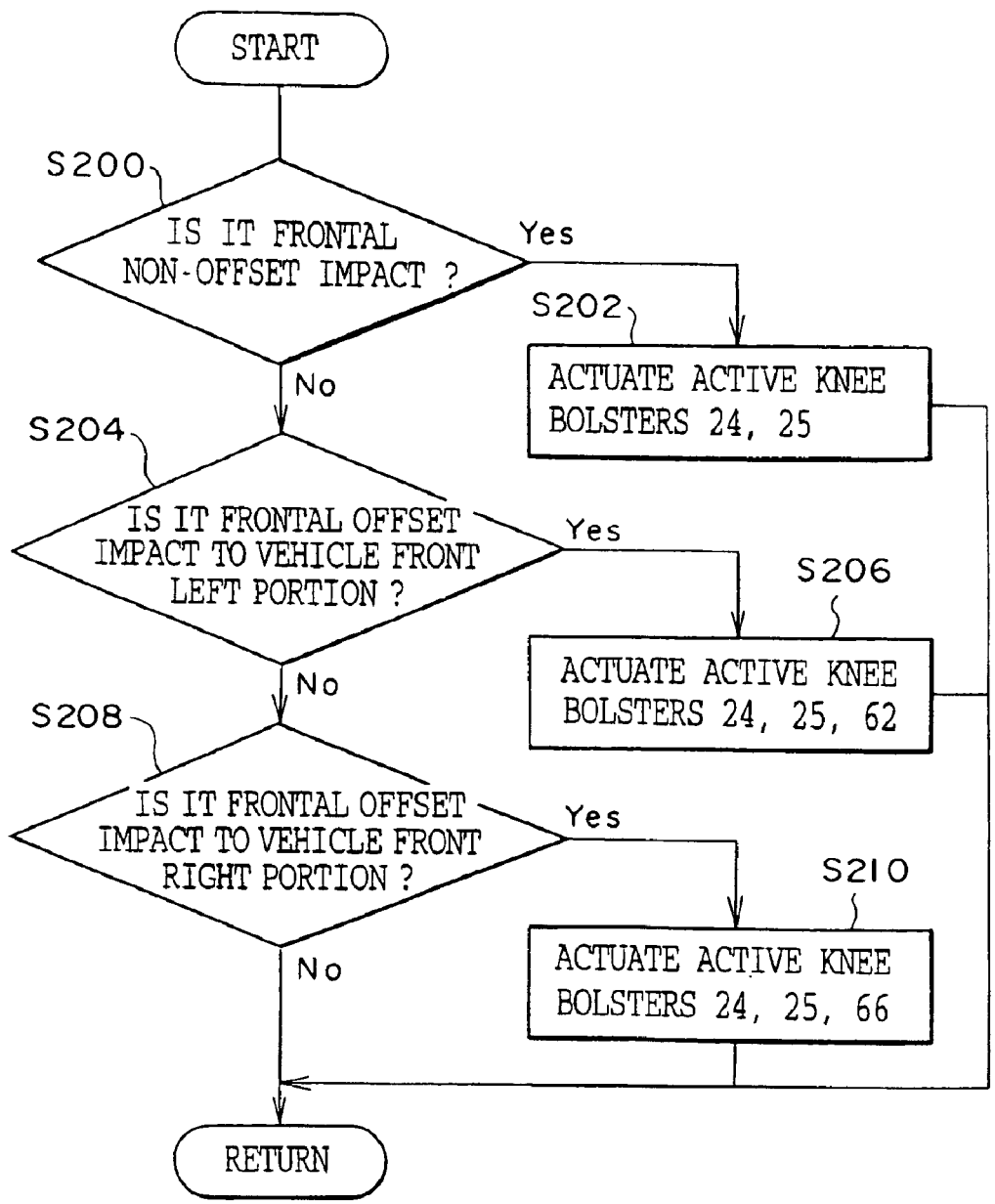

PASSENGER PROTECTION APPARATUS FOR A VEHICLE

CROSS-REFERENCE TO RELATED APPLICATION

This application claims priority under 35USC 119 from Japanese Patent Application No. 2002-333287, the disclosure of which is incorporated by reference herein.

BACKGROUND OF THE INVENTION

1. Field of the Invention

The present invention relates to a passenger protection apparatus for a vehicle and, more particularly, to a passenger protection apparatus which is mounted in a motor vehicle or the like.

2. Description of the Related Art

A passenger protection apparatus, which is mounted in a vehicle such as, for example, an automobile or the like, and comprises a first protector (also called an active knee bolster) which is movably supported on the vehicle body side and a second protector (also called an active knee bolster), and first and second actuators for driving the first and second protectors, respectively, is known. During a collision, the first and second protectors are driven by the first and second actuators so as to restrain lower limbs of a passenger or occupant, who is seated on a passenger seat, from the vehicle front side. At the same time, a front side portion of a seat cushion separates from a rear side portion of the seat cushion and moves toward the vehicle front side. For example, refer to Japanese Patent Publication No. 2679405 (FIGS. 1 and 7).

However, in the above-described prior art structure, the first and second protectors concurrently operate and restrain the (right and left) lower limbs of the passenger uniformly in a direction from front to rear of the vehicle. Accordingly, during a frontal offset impact, i.e., a frontal impact at a point, which is offset rightward or leftward with respect to a vehicle center line, of the vehicle front, or during an oblique impact, the passenger is likely to move diagonally forward or in an irregular direction. Therefore, with such first and second protectors, it is difficult to reliably restrain both of the lower limbs of the passenger.

SUMMARY OF THE INVENTION

In light of the above-described circumstances, an object of the present invention is to provide a passenger protection apparatus for a vehicle, which apparatus enables reliable restraint of the lower limbs of a passenger during a collision even if it is a frontal offset collision or an oblique impact.

In order to achieve at least the object described above, according to an aspect of the present invention, there is provided a passenger protection apparatus for a vehicle, said apparatus comprising: a pair of active knee bolsters provided in an instrument panel or at a vicinity thereof, each bolster being capable of restraining a corresponding lower limb of a passenger; a detector which, at a time of a collision, can detect a direction thereof; and a controller which, in accordance with the detection, can control the active knee bolsters independently from each other.

According to another aspect of the present invention, there is provided a passenger protection apparatus for a vehicle, said apparatus comprising: a pair of active knee bolsters provided in an instrument panel or at a vicinity thereof, each bolster being capable of restraining a corresponding lower limb of a passenger; another active knee bolster provided in a vehicle front side door or at a vicinity thereof, said another bolster being capable of restraining one of the lower limbs; yet another active knee bolster provided in a center console or at a vicinity thereof, said yet another bolster being capable of restraining the other of the lower limbs; a detector which, at a time of a collision, can detect a direction thereof; and a controller which, in accordance with the detection, can control the active knee bolsters independently from one another.

The foregoing and other objects, features and advantages of the present invention will become apparent to one skilled in the art from the following description of preferred embodiments of the invention, as illustrated in the accompanying drawings, and appended claims.

BRIEF DESCRIPTION OF THE DRAWINGS

FIG. 8 is a flowchart showing operation of the passenger protection apparatus according to the second embodiment of the present invention.

DETAILED DESCRIPTION OF THE INVENTION

Referring now to FIGS. 1 to 5, a first embodiment of a passenger protection apparatus according to the present invention will be described in detail below.

In the figures, arrows "FR" indicate a vehicle forward direction, arrows "UP" indicate a vertical upwards direction, and arrows "IN" indicate a vehicle inward direction.

Figure 1:
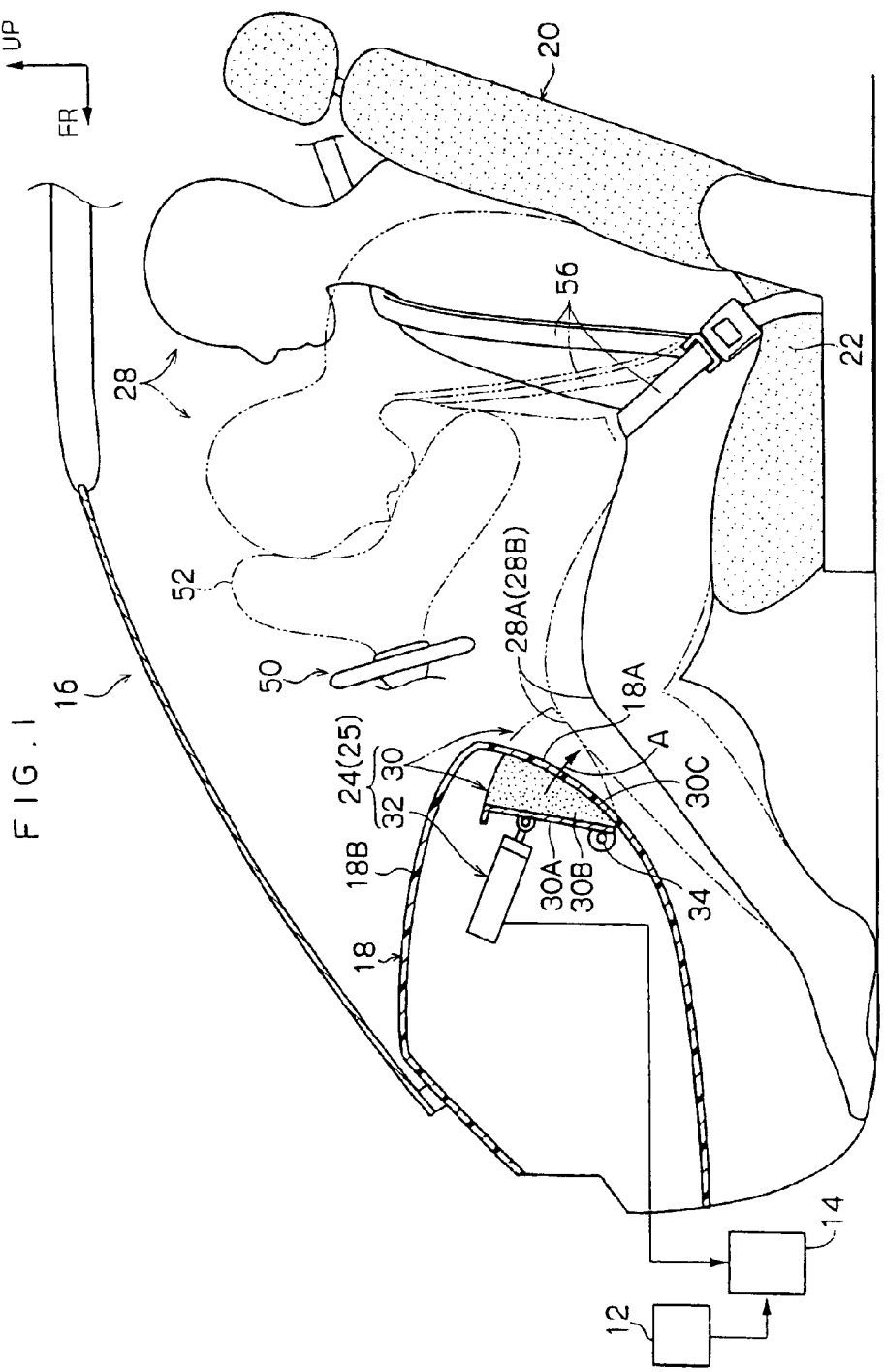
FIG. 1 is a side sectional view of a passenger protection apparatus for a vehicle according to a first embodiment of the present invention.

As shown in FIG. 1, the passenger protection apparatus according to the present embodiment is provided with acceleration sensors 12, which measure a deceleration of a vehicle to detect a vehicle collision and which, at a time of a collision, measure a direction thereof as collision direction measuring means. The acceleration sensors 12 are disposed at both sides of a front side member and are connected to a control circuit 14 serving as control means including a microcomputer. The control circuit 14 compares signals from both of the acceleration sensors 12, and then, detects a vehicle collision and measures the direction of the collision.

In an instrument panel 18 of a vehicle body 16, active knee bolsters 24 and 25 are provided, which are positioned diagonally above the front of a seat cushion 22 of a front seat 20. Each of the active knee bolsters 24 and 25 includes a body portion 30 to restrain a lower limb portion (especially, a knee portion), from diagonally above the front thereof, of a vehicle occupant 28 who is seated on the passenger seat 20, and an actuator 32 to move the body portion 30 toward the lower limb portion of the vehicle occupant 28.

Figure 2:
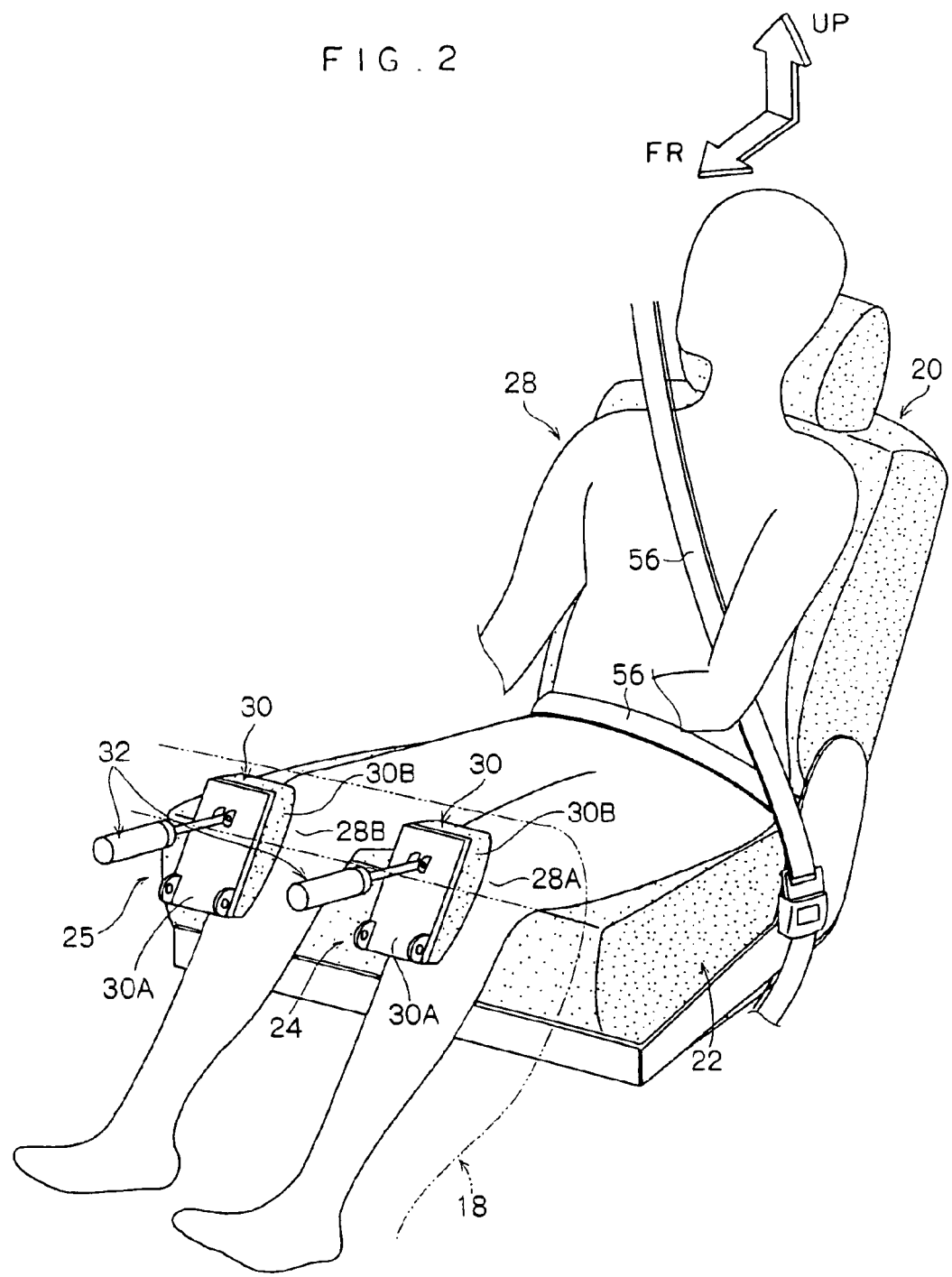
FIG. 2 is a perspective view showing a main part of the passenger protection apparatus according to the first embodiment of the present invention, as seen obliquely from a vehicle front side.

As shown in FIG. 2, the left side active knee bolster 24 can restrain a left lower limb portion 28A of the vehicle occupant 28 and the right side active knee bolster 25 can restrain a right lower limb portion 28B of the vehicle occupant 28. The body portion 30 of each of the active knee bolsters 24 and 25 includes a base plate 30A and an EA member 30B, which is provided on a vehicle occupant side of the base plate 30A and which is made of urethane material or the like.

As shown in FIG. 1, a skin portion 30C, which is made from resin material or the like, is provided on a vehicle occupant side of the EA member 30B of each of the active knee bolster body portions 30. Each of the skin portions 30C constitutes part of a general surface 18A of the instrument panel 18.

The actuator 32 of each of the active knee bolsters 24 and 25 comprises a cylinder that is operated by gas from an inflator, which inflator is operated by a squib that is connected to the control circuit 14. A connecting shaft 34 is provided at a lower portion of the base plate 30A along a vehicle widthwise direction, through which the body portion 30 is connected to the vehicle body 16. When the actuator 32 operates, the body portion 30 is rotated around the connecting shaft 34 toward the lower limb portion 28A/28B of the vehicle occupant 28 (in an arrow A direction in FIG. 1), from a retracted position illustrated by full lines in FIG. 1 to a restrained position illustrated by double-dashed lines in FIG. 1.

The control circuit 14 receives input signals from the acceleration sensors 12 and compares the input signals to determine whether a collision has occurred. If a frontal impact or collision to the vehicle 16 without offset (i.e., a frontal non-offset impact to the vehicle) has occurred, the actuators 32 of the active knee bolsters 24 and 25 are operated so that the left and right lower limb portions 28A and 28B of the vehicle occupant 28 are restrained by the body portions 30 of the active knee bolsters 24 and 25, as shown in FIG. 2.

Figure 3:
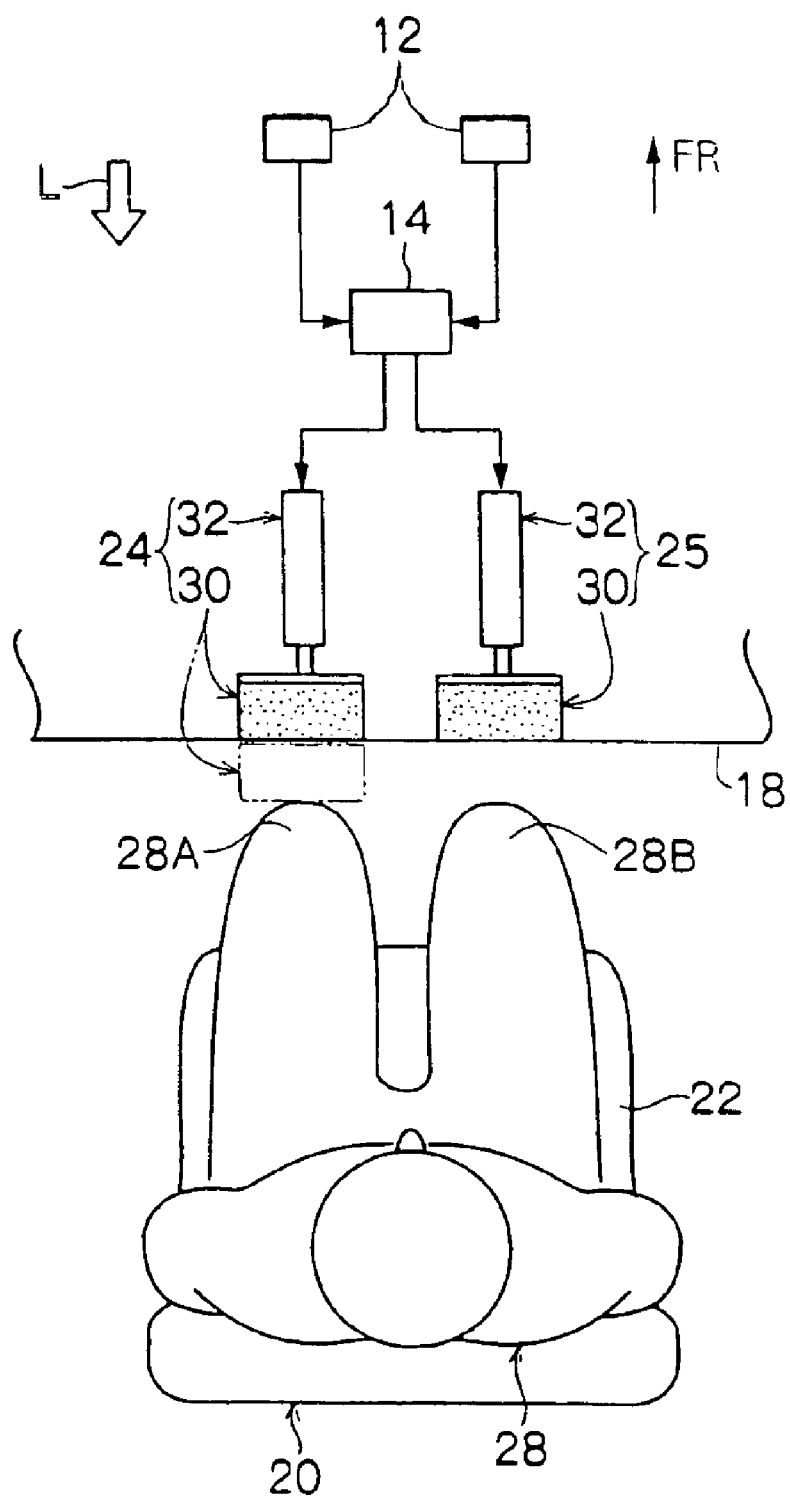
FIG. 3 is a plan view showing an operation of the passenger protection apparatus according to the first embodiment of the present invention.

If a frontal (offset) impact to a vehicle front left portion, as indicated by arrow L in FIG. 3, has occurred, only the actuator 32 of the active knee bolster 24 is operated such that only the left lower limb portion 28A of the vehicle occupant 28 is restrained by the body portion 30 of the active knee bolster 24, as shown by double-dashed lines in FIG. 3.

Figure 4:
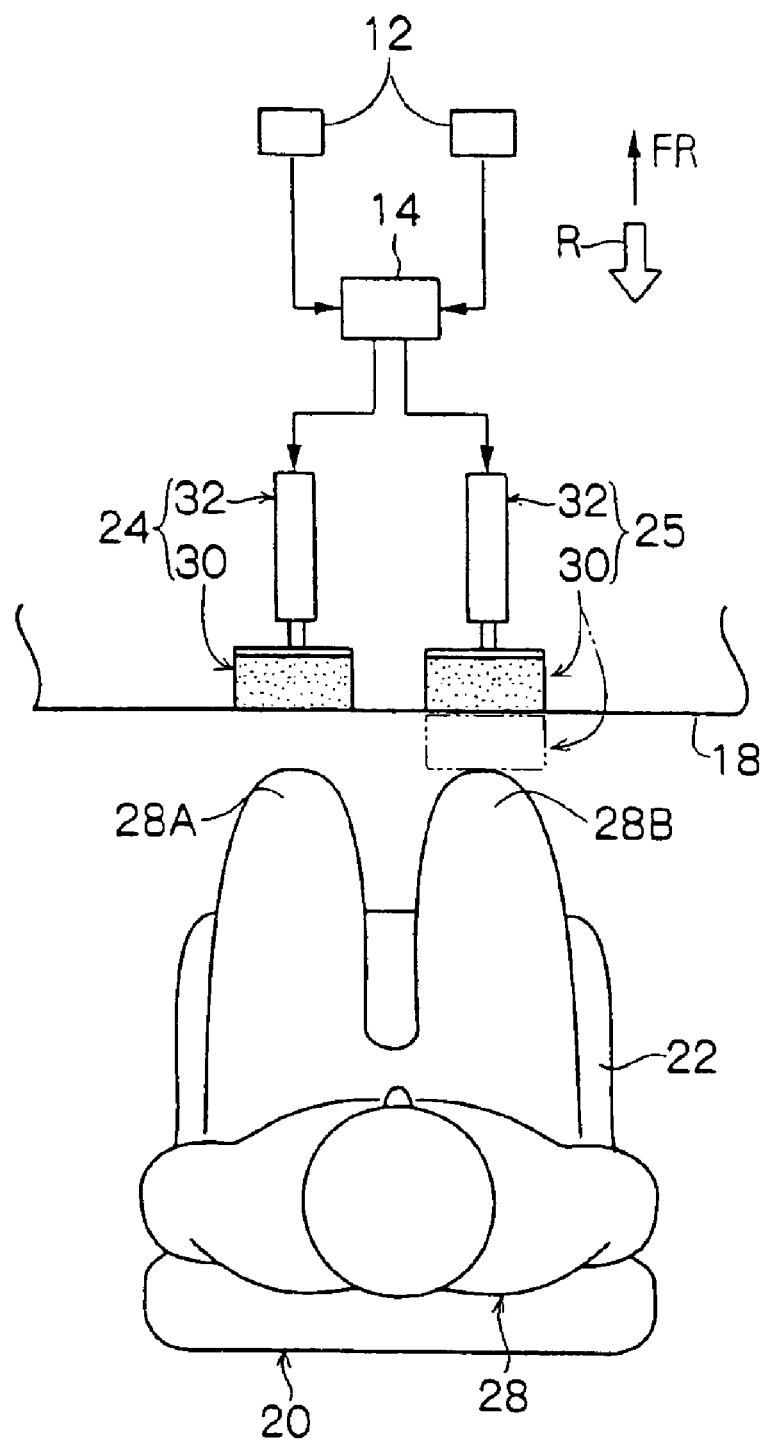
FIG. 4 is a plan view showing another operation of the passenger protection apparatus according to the first embodiment of the present invention.

If a frontal (offset) impact to a vehicle front right portion, as indicated by arrow R in FIG. 4, has occurred, only the actuator 32 of the active knee bolster 25 is operated such that only the right lower limb portion 28B of the vehicle occupant 28 is restrained by the body portion 30 of the active knee bolster 25, as shown by double-dashed lines in FIG. 4.

As shown in FIG. 1, in the present embodiment, an air bag for a passenger seat is mounted at a top portion 18B within the instrument panel 18, and an air bag 52 for a driver seat is mounted in a steering wheel 50 (only the air bag 52 for a driver seat is shown in FIG. 1). Inflators, which operate these air bags 52, are each connected to the control circuit 14.

Reference numeral 56 in FIG. 1 denotes a seat belt.

Figure 5:
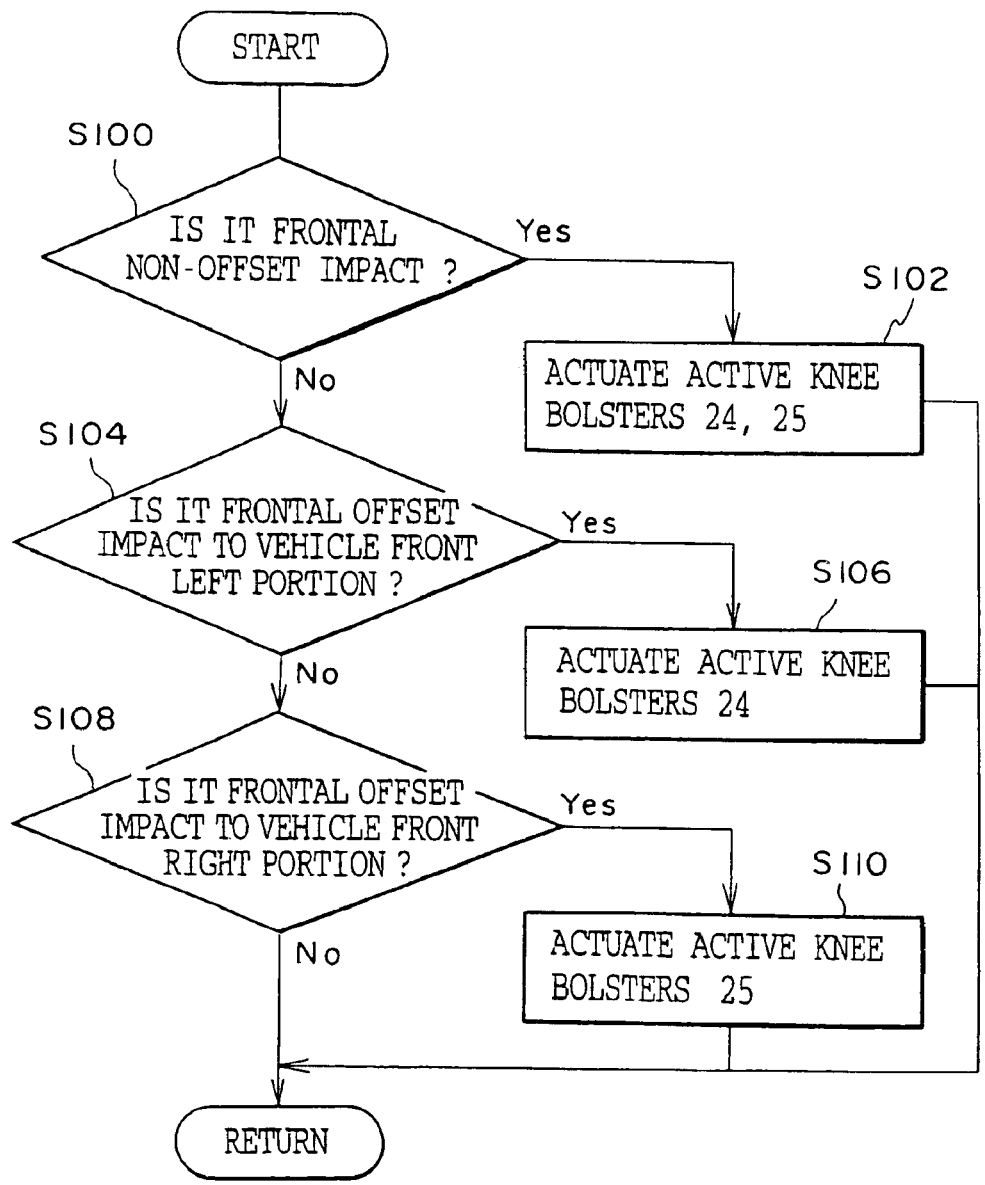
FIG. 5 is a flowchart showing operation of the passenger protection apparatus according to the first embodiment of the present invention.

Operation of the first embodiment of the invention will now be described with reference to a flowchart shown in FIG. 5.

In the present embodiment, at a time of a vehicle collision, by comparing input signals from the acceleration sensors 12, the control circuit 14 determines whether a frontal non-offset impact to the vehicle 16 has occurred, at step S100.

If the determination at step S100 is affirmative (i.e., that a frontal non-offset impact to the vehicle has occurred), the process proceeds to step S102. At step S102, the control circuit 14 causes the actuators 32 of the active knee bolsters 24 and 25 to operate such that the lower limb portions 28A and 28B of the vehicle occupant 28 are held or restrained by the body portions 30 of the active knee bolsters 24 and 25, as shown in FIG. 2.

If the determination at step S100 is negative (i.e., that a frontal non-offset impact to the vehicle has not occurred or that a collision is not a frontal non-offset impact to the vehicle), the process proceeds to step S104.

At step S104, it is determined whether a frontal (offset) impact to the vehicle front left portion has occurred. If the determination at step S104 is affirmative (i.e., that a frontal (offset) impact to the vehicle front left portion has occurred), the process proceeds to step S106. At step S106, only the actuator 32 of the left side active knee bolster 24 is operated such that only the left lower limb portion 28A of the vehicle occupant 28 is held or restrained by the body portion 30 of the left side active knee bolster 24, as shown by double-dashed lines in FIG. 3.

If the determination at step S104 is negative (i.e., that a frontal (offset) impact to the vehicle front left portion has not occurred or that a collision is not a frontal (offset) impact to the vehicle front left portion), the process proceed to step S108.

At step S108, it is determined whether a frontal (offset) impact to the vehicle front right portion has occurred. If the determination at step S108 is affirmative (i.e., that a frontal (offset) impact to the vehicle front right portion has occurred), the process proceeds to step S110. At step S110, only the actuator 32 of the right side active knee bolster 25 is operated such that only the right lower limb portion 28B of the vehicle occupant 28 is held or restrained by the body portion 30 of the right side active knee bolster 25, as shown by double-dashed lines in FIG. 4.

As seen from the foregoing, in the above-described first embodiment, during a vehicle collision, e.g., a frontal offset impact, the vehicle occupant or passenger 28 is likely to move in an obliquely forward direction. Then, one of the active knee bolsters 24 or 25, which is positioned at the frontal offset impact side, is selectively or independently operated so as to reliably restrain the corresponding one of the lower limbs 28A or 28B, which is positioned at the same side, of the vehicle occupant 28 seated on the passenger seat 20.

Next, a second embodiment of the present invention will be described in detail with reference to FIGS. 6 and 7.

Note that portions or parts that are substantially the same as in the first embodiment are given the same reference numerals, and descriptions thereof are appropriately omitted.

Figure 6:
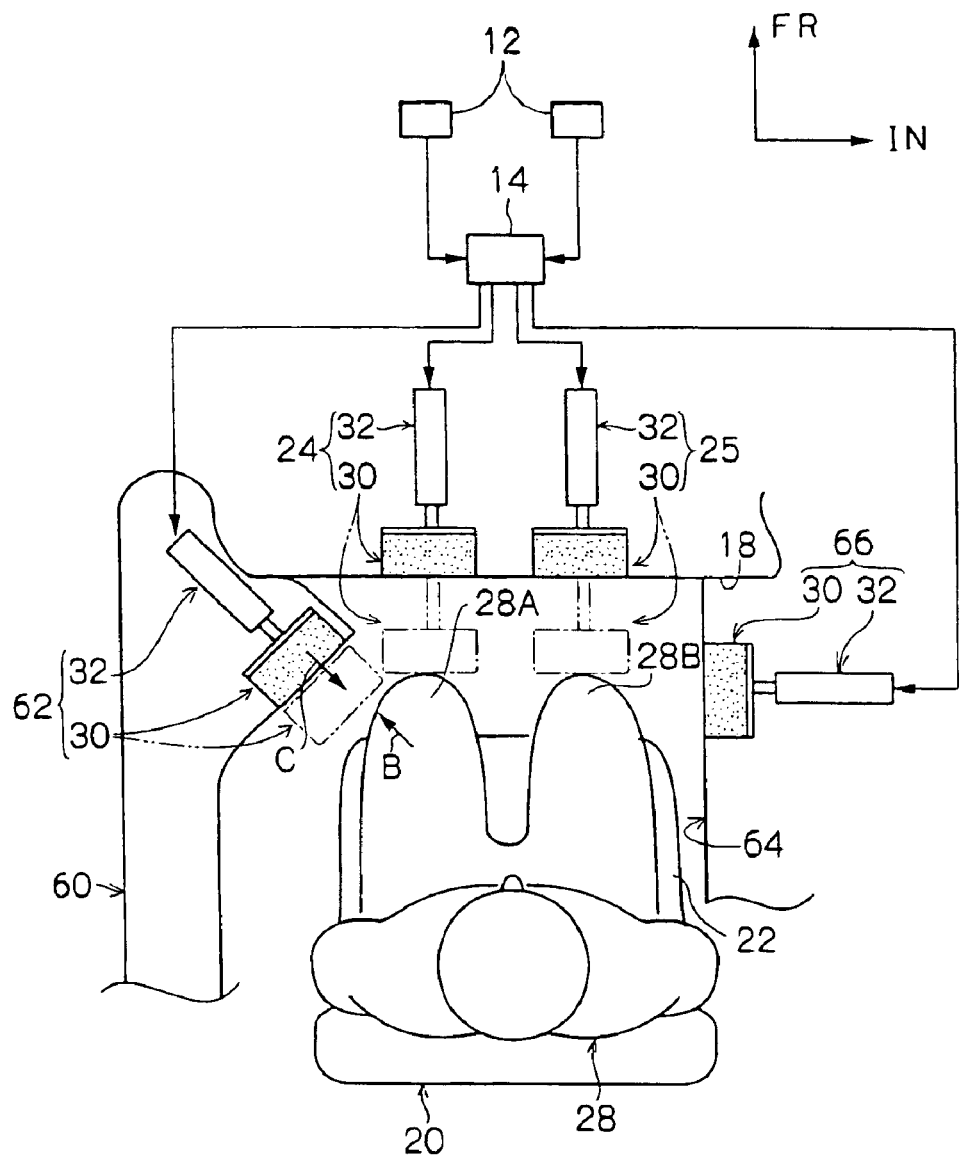
FIG. 6 is a plan view showing a passenger protection apparatus according to a second embodiment of the present invention.
Figure 7:
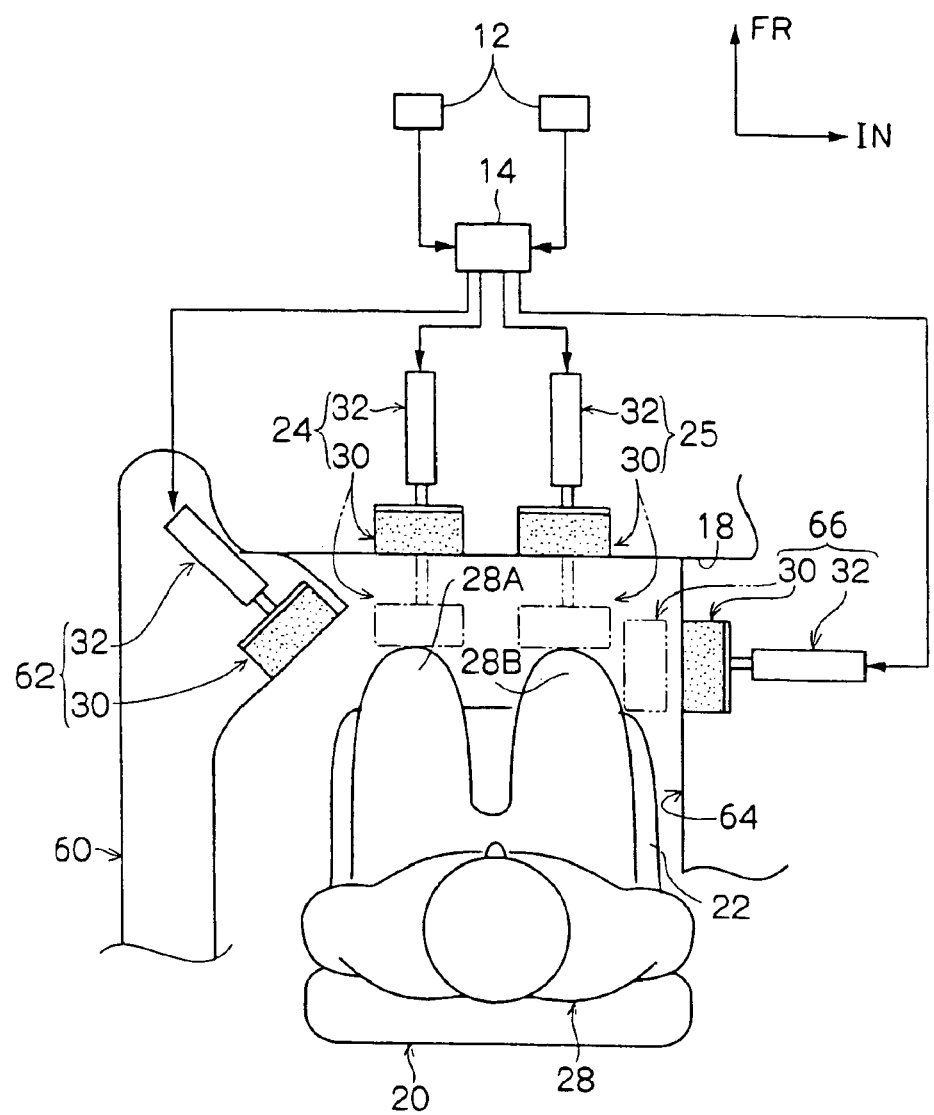
FIG. 7 is a plan view showing the passenger protection apparatus according to the second embodiment of the present invention.

In the second embodiment, as shown in FIG. 6, another active knee bolster 62 is provided at a front portion within a front side door 60 (in this illustrated embodiment, a front left side door), which active knee bolster extends diagonally inward from front to rear. The active knee bolster 62 includes a body portion 30 to restrain a left lower limb portion 28A, from a diagonally outward and frontward side thereof, of the vehicle occupant 28 who is seated on the passenger seat 20, and an actuator 32 to move the body portion 30 toward the left lower limb portion 28A of the vehicle occupant 28.

Yet another active knee bolster 66 is provided at a front side portion, in the vicinity of the instrument panel 18, within a center console 64, which active knee bolster extends in a vehicle widthwise direction approximately toward the passenger seat. The active knee bolster 66 includes a body portion to restrain a right lower limb portion 28B of the vehicle occupant 28 from an inner side in the vehicle widthwise direction, and an actuator 32 to move the body portion 30 toward the right lower limb portion 28B of the vehicle occupant 28.

The actuators 32 of the active knee bolsters 62 and 66 are each connected to the control circuit 14, in a manner similar to those of the first embodiment.

The control circuit 14 receives input signals from the acceleration sensors 12 and compares the input signals to determine whether a collision has occurred. If a frontal impact or collision to the vehicle 16 without offset has occurred, the actuators 32 of the active knee bolsters 24 and 25 are operated such that the left and right limb portions 28A and 28B of the vehicle occupant 28 are restrained by the body portions 30 of the active knee bolsters 24 and 25, similarly to the first embodiment.

If a frontal (offset) impact to the vehicle front left portion has occurred, the actuators 32 of the active knee bolsters 24 and 25 are operated. At the same time, the actuator 32 of the active knee bolster 62 in the front side door 60 is operated such that the left lower limb portion 28A of the vehicle occupant 28 is restrained by the body portion 30 of the active knee bolster 62 (together with the body portion 30 of the left side active knee bolster 24), as shown by double-dashed lines in FIG. 6.

If a frontal (offset) impact to the vehicle front right portion has occurred, the actuators 32 of the active knee bolsters 24 and 25 are operated. At the same time, the actuator 32 of the active knee bolster 66 in the center console 64 is operated such that the right lower limb portion 28B of the vehicle occupant 28 is restrained by the body portion 30 of the active knee bolster 66 (together with the body portion 30 of the right side active knee bolster 25), as shown by double-dashed lines in FIG. 7.

Operation of the second embodiment of the invention will now be described with reference to a flowchart shown in FIG. 8.

In the present embodiment, at a time of a vehicle collision, by comparing input signals from the acceleration sensors 12, the control circuit 14 determines whether a frontal non-offset impact to the vehicle 16 has occurred, at step S200.

If the determination at step S200 is affirmative (i.e., that a frontal non-offset impact to the vehicle has occurred), the process proceeds to step S202. At step S202, the control circuit 14 causes the actuators 32 of the active knee bolsters 24 and 25 to operate such that the lower limb portions 28A and 28B of the vehicle occupant 28 are held or restrained by the body portions 30 of the active knee bolsters 24 and 25, similarly to the first embodiment.

If the determination at step S200 is negative (i.e., a frontal non-offset impact to the vehicle has not occurred or that a collision is not a frontal non-offset impact to the vehicle), the process proceeds to step S204.

At step S204, it is determined whether a frontal (offset) impact to the vehicle front left portion has occurred. If the determination at step S204 is affirmative (i.e., that a frontal (offset) impact to the vehicle front left portion has occurred), the process proceeds to step S206. At step S206, the active knee bolster 62 in the front side door 60 as well as the active knee bolsters 24 and 25 are activated such that the left and right limb portions 28A and 28B of the vehicle occupant 28 are restrained by the body portions 30 of the active knee bolsters 24, 25 and 62, as shown by double-dashed lines in FIG. 6.

If the determination at step S204 is negative (i.e., that a frontal (offset) impact to the vehicle front left portion has not occurred or that a collision is not a frontal non-offset impact to the vehicle), the process proceed to step S208.

At step S208, it is determined whether a frontal (offset) impact to the vehicle front right portion has occurred. If the determination at step S208 is affirmative (i.e., that a frontal (offset) impact to the vehicle front right portion has occurred), the process proceeds to step S210. At step S210, the active knee bolster 66 in the center console 64 as well as the active knee bolsters 24 and 25 are activated such that the left and right limb portions 28A and 28B of the vehicle occupant 28 are restrained by the body portions 30 of the active knee bolsters 24, 25 and 66, as shown by double-dashed lines in FIG. 7.

As seen from the foregoing, in the above-described second embodiment, during a vehicle collision, e.g., a frontal offset impact, the vehicle occupant or passenger 28 is likely to move in an obliquely forward direction. Then, one of the active knee bolsters 62 or 66, which is positioned at the frontal offset impact side, is selectively or independently operated so as to reliably restrain the corresponding one of the lower limbs 28A or 28B, which is positioned at the same side, of the vehicle occupant 28 seated on the passenger seat 20.

Further, in the present embodiment, as shown by double-dashed lines in FIG. 6, the active knee bolster 62 disposed in the front side door 60 can effectively restrain solely or in combination with the active knee bolster 24, the left side lower limb 28A of the passenger 28, and the active knee bolster 66 disposed in the center console 64 can effectively restrain solely or in combination with the active knee bolster 25, the right side lower limb 28B of the passenger 28.

It is to be understood that the present invention is by no means limited to the specific embodiments as illustrated and described herein, and that various modifications thereof may be made which fall within the scope of the present invention as defined in the appended claims. A structure in which, during an oblique impact or a side impact collision, the active knee bolsters are selectively operated can be adopted.

Further, in the second embodiment described above, at step S206, only one active knee bolster, e.g., the active knee bolster 62 may be operated and, at step S210, only one active knee bolster, e.g., the active knee bolster 66 may be operated.

Still further, the present invention is not limited to the above embodiments with respect to the number of active knee bolsters to be provided, the arrangement thereof, or the number of active knee bolsters to be operated in accordance with traits of a vehicle collision.

Furthermore, in the respective embodiments, the acceleration sensors 12 serve both as collision detecting means and collision direction detecting means. However, the invention is not limited to such a configuration. A structure is possible in which acceleration sensors are provided and used as collision detecting means and a camera or the like is provided and used as collision direction detecting means.

As described above, according to the present invention, lower limbs of the vehicle occupant can be successfully restrained even during a frontal offset impact or an oblique impact.

What is claimed is:

1. A passenger protection apparatus for a vehicle, said apparatus comprising:

at least one pair of active knee bolsters provided in an instrument panel or at a vicinity thereof, the pair of active knee bolsters provided for each of at least one passenger, and each bolster being capable of restraining a corresponding lower limb of each of the at least one passenger;

a detector which, at a time of a collision, can detect a direction thereof; and a controller which, in accordance with the detection, can control the active knee bolsters independently from each other.

2. The passenger protection apparatus of claim 1, wherein each of the active knee bolsters includes an operating portion for restraining the corresponding passenger lower limb and a driving portion for driving the operating portion.

3. The passenger protection apparatus of claim 2, wherein the operating portion is movable in a direction substantially parallel to the direction of a collision.

4. The passenger protection apparatus of claim 2, wherein the operating portion is movable in a hinged door manner.

5. The passenger protection apparatus of claim 2, wherein the operating portion constitutes part of a surface of the instrument panel.

6. The passenger protection apparatus of claim 1, wherein the detector comprises a vehicle acceleration sensor.

7. The passenger protection apparatus of claim 1, wherein the controller appropriately and independently controls at least one of the pair of active knee bolsters in accordance with conditions of a collision.

8. The passenger protection apparatus of claim 7, wherein the collision is at least one of a frontal collision, a frontal offset collision, an oblique collision, and a side impact collision.

9. A passenger protection apparatus for a vehicle, said apparatus comprising:

at least one pair of active knee bolsters provided in an instrument panel or at a vicinity thereof the pair of knee bolsters provided for each of at least one passenger, and each bolster being capable of restraining a corresponding lower limb of each of the at least one passenger;

another active knee bolster provided in a vehicle front side door or at a vicinity thereof, said another bolster being capable of restraining one of the lower limbs;

yet another active knee bolster provided in a center console or at a vicinity thereof, said yet another bolster being capable of restraining the other of the lower limbs;

a detector which, at a time of a collision, can detect a direction thereof; and a controller which, in accordance with the detection, can control the active knee bolsters independently from one another.

10. The passenger protection apparatus of claim 9, wherein each of the active knee bolsters includes an operating portion for restraining the corresponding passenger lower limb and a driving portion for driving the operating portion.

11. The passenger protection apparatus of claim 9, wherein the controller appropriately and independently controls at least one of the active knee bolsters in accordance with conditions of a collision.

12. The passenger protection apparatus of claim 11, wherein the collision is at least one of a frontal collision, a frontal offset collision, an oblique collision, and a side impact collision.

* * * * *